Figures 1, 2, 3, 4, 5, 6:
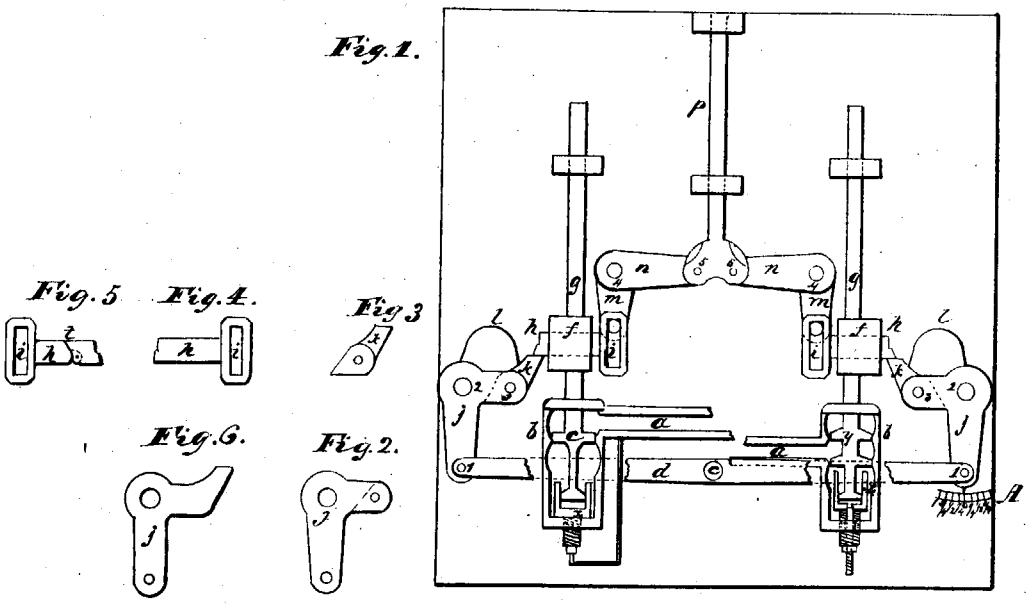

J. F. Hamilton,

Steam-Engine-Valve-Gear.

No. 1,863. Reissued Feb. 7, 1865.

Witnesses:
James F. Johnston
Alexander Hays.

Inventor:
Joseph F. Hamilton

AM. PHOTO-LITHO. CO. N.Y. (OSBORNE'S PROCESS.)

UNITED STATES PATENT OFFICE.

JOSEPH F. HAMILTON, OF PITTSBURG, PENNSYLVANIA.

IMPROVEMENT IN VALVE-GEARS.

Specification forming part of Letters Patent No. 39,229, dated July 14, 1863; Reissue No. 1,863, dated February 7, 1865.

*To all whom it may concern:*

Be it known that I, JOSEPH F. HAMILTON, of Pittsburg, in the county of Allegheny and State of Pennsylvania, have invented a new and useful Improvement in Self-Acting and Variable Cut-Off Gear for Valves of Steam-Engines; and I do hereby declare that the following is a full and exact description thereof, reference being had to the accompanying drawings, and to the letters of reference marked thereon.

The nature of my invention consists in the use of a regulating coupling-arm, having an advancing and receding motion, and used in combination with a valve or valves and a lifter or propelling arm or arms on the rock-shaft of steam-engines, the whole being constructed, arranged, and operated so that the valve or valves will cut off or admit steam to the cylinder in proportion to the power required of the engine.

In the accompanying drawings, Figure 1 represents a side view of the apparatus for operating the valves, and also represents a sectional view of the valves and their chambers, which are furnished with a steam cushion. Fig. 2 represents the valve-lifter. Fig. 3 represents the trigger of the valve-lifter. Fig. 4 represents the arm used for regulating the lift of the valves. Fig. 5 represents a jointed arm, which may be used for regulating the lift of the valves. Fig. 6 represents the valve-lifter and trigger combined.

In the accompanying drawings, *p* represents a stem or rod, which I attach to the ordinary governor of the engine by any of the known means. To the rod *p* are attached two arms, *n*, which are attached to two arms, *m*, furnished with wrists *o*, which move in slots *i* of the arms *h*, which move in and out through guides *f* on the stem *g* of the valves *c* and *y*.

*c* represents a single poppet-valve and *y* represents the ordinary balance-valve.

*k* represents the triggers of the lifters *j*, which are attached to the rock-shafts of the engine or to suitable stands made for the purpose of supporting them. The lifters are connected by means of link *d*, which is furnished with a wrist, *e*, to which is attached the cam-rod of the engine.

*l* represents a spring, used for holding the triggers *k* in their proper position. The trigger and spring are also used for the purpose of allowing the lifters *j* to assume their lifting position after they have passed the point or end of the arms *h*.

It will be observed that it would be impossible for the lifter to return to its proper position after it has passed the arm *h* without it or the arm yielding.

*b* represents the valve-chambers.

*a* represents the steam or supply pipe.

*x* represents my improved steam-cushion for seating the valves.

1, 2, 3, 4, and 5 represent joints.

A represents a scale for showing the "stroke" of the engine and the point at which the steam is cut off.

The form, size, and mode of constructing the stands and supports for the lifters *j*, stems *g* and *p*, and the other parts of my device for cut off I leave to the taste, skill, and judgment of the mechanic.

It will readily be observed by the skillful mechanic that the lifters *j* may be made in one piece, as represented in Fig. 6, and the arm *h* furnished with a joint, as represented in Fig. 5 and marked *t*, and that the result obtained thereby will be the same as that produced by the use of the trigger *k*.

The operation of my improvement is as follows: Having all things arranged and constructed as herein described and represented, I attach the cam-rod of the engine to wrist *e* of the link *d*, which will impart an oscillating motion to the lifters *j*, which will lift the valves alternately. The valves will remain open in proportion to the position of the arms *h*, which are moved out toward and drawn in from the lifters *j* by means of the arms *m* and *n*, which are attached to the rod *p*, which is attached to the governor or to its equivalent, the variations of which will vary the position of the arms *h*—in other words, if the governor or other mechanism used for operating the arms *h* should throw said arms their full length in toward the lifters *i*, then the engine will work full-stroke; but when the arms are thrown in only half their length then the engine will work half-stroke—that is to say, the valve or valves will remain open longer in the one case than in the other.

Now, it will be clearly seen that by my arrangement and use of the arms *h*, in combination with the lifters *j* and the governor or other mechanism used for operating them, they will cause the valve or valves to remain open for the admission of steam in proportion to the pressure of steam in the boiler and the labor required of the engine, always cutting the steam off at the desired point.

Having thus described the nature, construction, and operation of my improvement, what I claim as of my invention is—

The arrangement of the regulating coupling-arms *h*, lifters or propeller-arms *j k*, springs *l*, levers *m* and *n*, and link *d*, when used in connection with a governor, rock-shaft, or eccentric of steam-engines, the whole being constructed and operating substantially as herein described, and for the purpose set forth.

JOS. F. HAMILTON.

Witnesses:
JAMES J. JOHNSTON,
ALEXANDER HAYS.